(12) United States Patent
Harrison et al.

(10) Patent No.: US 6,490,726 B2
(45) Date of Patent: Dec. 3, 2002

(54) APPLIANCES WITH THE INTERNET ACCESS

(75) Inventors: Robert G. Harrison, Seattle, WA (US); Robert D. Lamson, Seattle, WA (US)

(73) Assignee: Icebox, LLC, Seattle, WA (US)

( * ) Notice: Subject to any disclaimer, the term of this patent is extended or adjusted under 35 U.S.C. 154(b) by 0 days.

(21) Appl. No.: 09/046,947

(22) Filed: Mar. 23, 1998

(65) Prior Publication Data

US 2002/0116718 A1 Aug. 22, 2002

(51) Int. Cl.[7] .................. H04N 7/173; H04N 7/16
(52) U.S. Cl. .................. 725/110; 725/133; 725/141; 725/153
(58) Field of Search .................. 348/10, 12, 13, 348/552; 345/327; 455/6.3; 725/133, 141, 153, 109, 110

(56) References Cited

U.S. PATENT DOCUMENTS

| | | | |
|---|---|---|---|
| 5,539,479 A | | 7/1996 | Bertram |
| 5,774,664 A | * | 6/1998 | Hidary et al. ......... 395/200.48 |
| 5,828,370 A | * | 10/1998 | Moeller et al. ......... 345/328 |
| 5,850,218 A | * | 12/1998 | Lajoie et al. ......... 345/327 |
| 5,903,259 A | * | 5/1999 | Brusky et al. ......... 345/168 |
| 5,929,849 A | * | 7/1999 | Kikinis ......... 345/327 |
| 6,002,394 A | * | 12/1999 | Shein et al. ......... 345/327 |
| 6,012,112 A | * | 1/2000 | Brase et al. ......... 710/62 |
| 6,047,121 A | * | 4/2000 | Vaughan ......... 395/674 |
| 6,104,334 A | * | 8/2000 | Allport ......... 341/175 |
| 6,157,809 A | * | 12/2000 | Kambayashi ......... 455/5.1 |
| 6,202,212 B1 | * | 3/2001 | Sturgeon et al. ......... 725/141 |

OTHER PUBLICATIONS

Tarr, Greg; CMi Enters Convergence Through The Kitchen; Jan. 25, 1999.

* cited by examiner

*Primary Examiner*—Andrew Faile
*Assistant Examiner*—Kieu-oanh Bui
(74) *Attorney, Agent, or Firm*—Sonnenschein Nath & Rosenthal

(57) ABSTRACT

Systems which have an integrated unit or module and ENTERTAINMENT, COACH, and INTERNET modes of operation. Operation of the system may be controlled with a dedicated remote unit. The ENTERTAINMENT mode of operation allows a user to watch television or play an audio or video disk, and the COACH mode gives a user access to user-selected information stored on a disk of the character just described. In the INTERNET mode, the user can log onto and surf the Internet.

20 Claims, 12 Drawing Sheets

R=RESTART
B=BACK
F=NEXT

APPLIANCES WITH THE INTERNET ACCESS

CROSS-REFERENCE TO RELATED APPLICATIONS

This application is related to and claims the benefit of the filing date of U.S. provisional application No. 60/115,197 filed Jan. 6, 1999, and the following identified U.S. patent applications, which are incorporated herein by reference:

U.S. patent application Ser. No. 08/707,623, entitled "Educational and Training Devices and Methods" filed on Sep. 5, 1996 and issued on Oct. 5, 1999 as U.S. Pat. No. 5,961,333;

U.S. patent application Ser. No. 08/641,911, entitled "Information Retrieval and Presentation Systems With Direct Access To Retrievable Items Of Information," filed on May 2, 1996 and issued on Mar. 12, 1998 as U.S. Pat. No. 5,751,369;

U.S. patent application Ser. No. 08/624,983, entitled "Operation of Information/ Entertainment Centers," filed on Mar. 29, 1996 and issued on Jun. 9, 1998 as U.S. Pat. No. 5,764,304, which is a continuation-in-part of U.S. application No. 08/569,310 filed Dec. 8, 1995;

U.S. patent application Ser. No. 08/624,984, entitled "Data Storage Devices," filed on Mar. 29, 1996 and issued on Sep. 1, 1998 as U.S. Pat. No. 5,801,784, which is a continuation-in-part of U.S. application Ser. No. 08/569,310 filed Dec. 8, 1995;

U.S. patent application Ser. No. 08/625,719, entitled "Methods of Producing Data Storage Devices for Appliances," filed on Mar. 29, 1996 and issued on Apr. 27, 1999 as U.S. Pat. No. 5,898,462, which is a continuation-in-part of U.S. application Ser. No. 08/569,310 filed Dec. 8, 1995;

U.S. patent application Ser. No. 08/621,638, entitled "Systems In Which Information Can Be Retrieved From An Encoded Laser Readable Disc," filed on Mar. 26, 1996 and issued on Mar. 8, 1998 as U.S. Pat. No. 5,724,102, which is a divisional of U.S. patent application Ser. No. 08/569,310, filed Dec. 8, 1995; and U.S. patent application Ser. No. 08/569,310, entitled "Systems With A Remote Control In Which Information Can Be Retrieved From An Encoded Laser Readable Disc," filed Dec. 8, 1995 and issued on May 5, 1998 as U.S. Pat. No. 5,748,254, which is a continuation of U.S. patent application Ser. No. 08/505,969, filed Jul. 24, 1995, now abandoned.

BACKGROUND OF THE INVENTION

Heretofore invented have been certain new and novel products which feature an integrated module having: (a) a player for an optically readable, encoded data storage device such as a video compact disc, an audio compact disc, a laser disc, or a digital video disc; (b) a player for retrieving data from the disc; and (c) a screen on which the retrieved information can be displayed. Stored on the optically readable disc is data constituting a hierarchy of user-retrievable, multiple choice menus and, for each of the choices in the lowest level menu employed in navigating a particular course through the hierarchy, instructions or other information sought by the user. With the appliance in a COACH mode of operation, the selected information can be retrieved from the disc and displayed statically on the screen of the system or presented as a video for visual and audible reception, often as a demonstration of a technique for performing a particular task or a step of that task. Various products in this family have one or more additional, user-selectable operating modes in which the appliance is operative to carry out a different function called up by choosing the appropriate user-selectable mode. Examples of the operating modes built into various modules are:

| Mode | Function |
|---|---|
| ENTERTAINMENT | Allows the user to watch television or play a conventional audio or video disc. |
| APPLIANCE | Gives the integrated module control over one or more appliances-as examples only, a kitchen range, refrigerator, central heating system, air conditioner, or central vacuuming system. Also, diagnostic information on the controlled appliance(s) may be gathered and made available on the display screen of the appliance and at a service or repair facility. |
| TELEPHONE | Allows the appliance user to make and receive audio or audio/visual telephone calls. |
| SECURITY | Allows one to visually identify and converse with a person at an entry way and unlock the door at the entry way, all from the location of the appliance. |

SUMMARY OF THE INVENTION

These have now been invented and disclosed herein certain new and novel appliances of the character described above. Appliances embodying the principles of the present invention have a COACH mode of operation as described above and also an INTERNET mode of operation which allows an appliance user to easily and quickly connect to and reach a site on the Internet. To employ the INTERNET mode of operation, the appliance user does not need to know anything about computers or how computers are used to access the Internet.

Appliances employing the principles of the present invention may also have one or more of the other operating modes discussed above—ENTERTAINMENT, APPLIANCE, TELEPHONE, or SECURITY. The user employs dedicated mode selection buttons to select the ENTERTAINMENT, INTERNET, COACH, and TELEPHONE modes. The dedicated buttons are typically found on a remote control component of the appliance, but these buttons can also be duplicated in the integrated module of the appliance. The TELEPHONE mode may also be entered via a conventional telephonic component of the appliance, and operation of the appliance is automatically switched to the SECURITY mode when a doorbell at a controlled entrance is rung. Diagnostic functions are invoked automatically by information received from the control box of a controlled appliance and by commands issued by the appliance user and from the service/repair facility.

As suggested above, the ability to log onto the Internet by pressing a single button is a significant advantage of appliances embodying the principles of the present invention. This makes the Internet accessible to persons having no experience with or interest in computers and may allow even an experienced computer user to reach an Internet site more quickly.

The objects, features, and advantages of the invention will be apparent to the reader from the foregoing and the appended claims and as the ensuing detailed description and discussion of the invention proceeds in conjunction with the accompanying drawing.

DETAILED DESCRIPTION OF THE INVENTION

Figure 1:
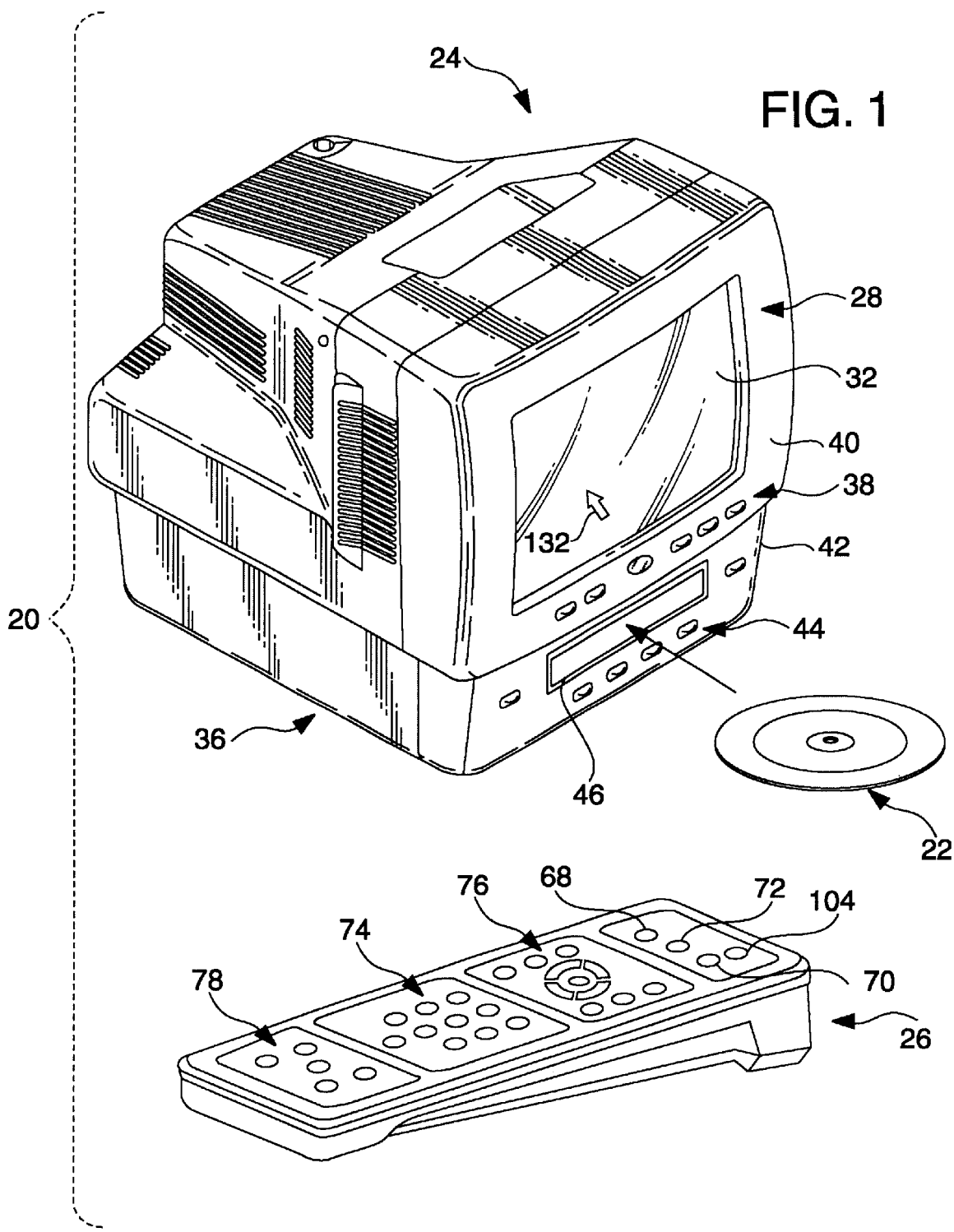
FIG. 1 depicts, pictorially, a multifunctional entertainment/information system (or appliance) which has an INTERNET mode of operation and embodies the principles of the present invention.

Referring now to the drawing, FIG. 1 depicts a system 20 so constructed that one can easily, and at any time, switch between: (a) watching television or playing an audio or visual compact disc or other optically readable disc in an ENTERTAINMENT mode of operation; (b) a COACH mode of operation in which information stored on a Video 1.1, Video 2.0, CDI, or other interactive optically readable disc 22 is retrieved and presented in a visual or visual/audio format; and (c) an INTERNET mode in which a system user can log onto and navigate the Internet.

The major components of system 20 are an integrated unit (or module) 24, a remote control 26, and the above-mentioned laser readable disc 22.

Integrated unit 24 includes a television unit 28 which has a CRT (cathode ray tube) 30 with a screen 32 and a video compact disc player 34, both housed in the same cabinet 36. Conventional onboard controls 38 for television unit 28 are located on the front panel 40 and the right-hand side panel 42 of cabinet 36, and onboard controls 44 for disc player 34 are also located on front cabinet panel 40. A conventional tray 46 is used to load disc 22 into player 34.

In the interest of making system 20 user friendly, the controls 38 and 44 are preferably color-coded. A representative color-coding scheme appears in Table 1 of commonly owned, co-pending U.S. patent application No. 08/621,638 filed Mar. 26, 1996. That application is hereby incorporated in this application by reference.

Figure 2:
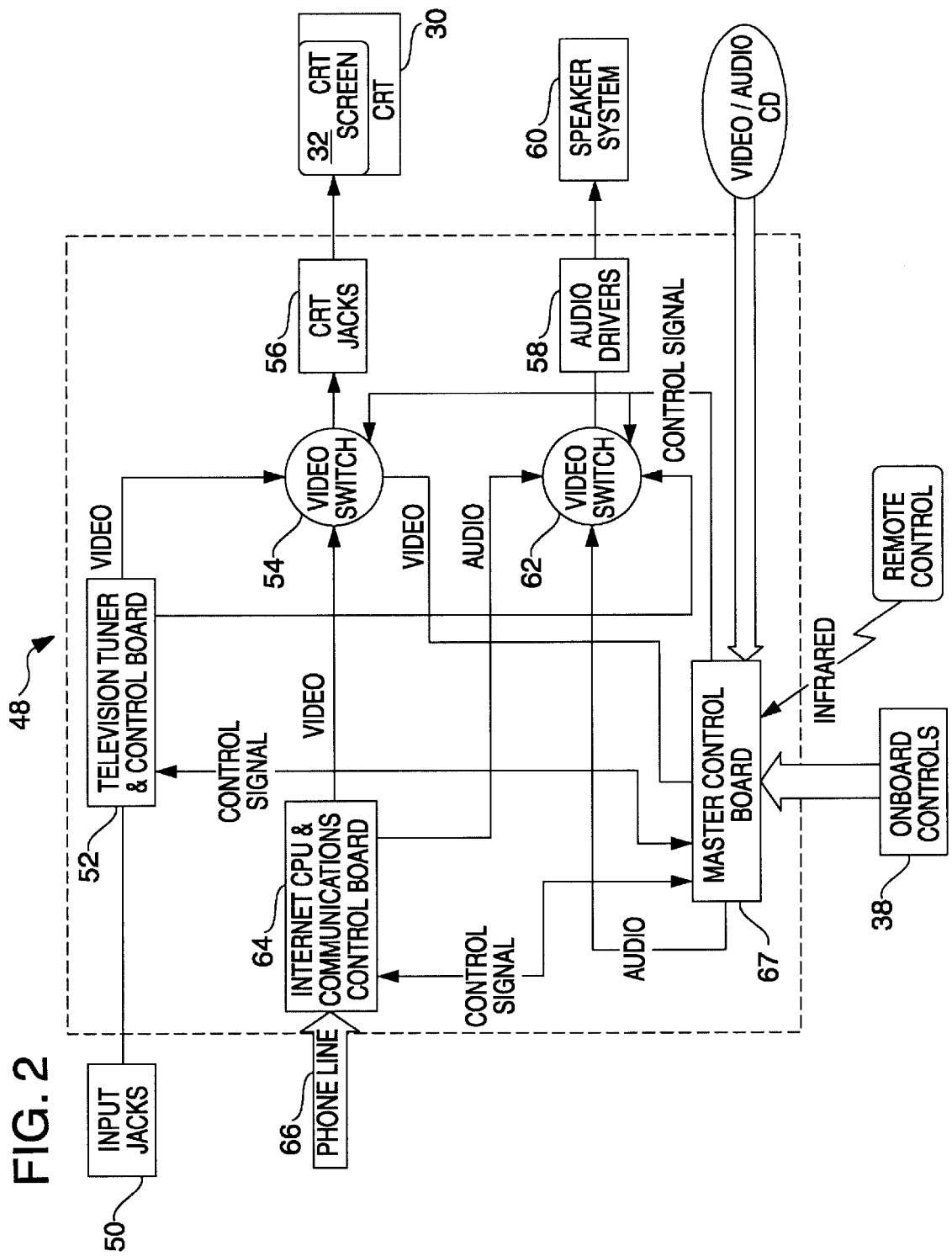
FIG. 2 shows, in schematic form, the operating system of a module (or integrated unit) which is a component of the appliance shown in FIG. 1.

The internal operating components of integrated unite 24, depicted schematically in FIG. 2, constitute an integrated operating system identified by reference character 48. These components include input jacks which are collectively identified by reference character 50 and which are employed to connect integrated unit 24 to a television signal source—a television antenna or cable and/or a VCR, each of which may be referenced as a means for capturing a television signal). A tuner/control board 52 (which is included in the means for capturing the television signal) coupled to user actuatable onboard controls 38 and to the hereinafter described push button controls of remote control 26 is employed to select one of the available television channels to watch or the VCR channel (usually 3 or 4) at the user's location. With system 20 operating in the ENTERTAINMENT mode of operation, the off-the-air or VCR signal is directed through a video switch 54 to CRT driver 56. The driver transmits to CRT 30 signals which can be converted by that system component to visual images. The visual images are displayed on the CRT screen 32 of television unit 28. Thus, CRT 30 provides means for converting the off-the air or VCR signal (i.e. television signal) to a visual image and for displaying the visual image.

The incoming signal typically also includes an audio component which is converted to audible sound by audio driver 58 and the illustrated stereo speakers 60. An audio switch 62 couples the audio driver 58 to the television source when the system user selects the ENTERTAINMENT mode of system operation.

Selection of the COACH mode of operation resets video switch 54 and audio switch 62 to transmit information retrieved from an optically readable disk 22 to CRT screen 32 and to stereo speakers 60.

In the COACH mode of operation of system 20, data representing visual components of information are read from encoded disc 22, decoded, and displayed on CRT screen 32 of integrated unit 24. Audio components of the information retrieved from disc 22 are converted to audible sound by stereo speakers 60. To this end, disc player 34 has a conventional mechanism (not shown) for spinning optically readable disc 22 and an equally conventional laser pickup (likewise not shown) for reading information stored in digital data files in the tracks on discs 20. That decoded data representing visual information is routed through video switch 54 and CRT driver 56 to CRT 30 and there converted to signals which appear as dynamic or static visual images on CRT display screen 32. Audio components of the retrieved information are routed through audio switch 62 and audio driver 58 to stereo speakers 60. As described in greater detail below, encoded disc 22 (or information storage means) may store an introductory video, items of information and a hierarchy of menus to selectively access the items of information when the module is in the COACH or Instructional mode. Thus, the introductory video, the items of information and the hierarchy of menus may be stored as visual or audio components on encoded disc 22.

The operating system 48 of integrated unit 24 also includes a phone modem (not shown) which is incorporated in Internet CPU and communications control board 64. The user of system 20 can log onto the Internet through this modem over telephone line 66 when integrated unit 24 is operating in the INTERNET mode and the video and audio switches 54 and 62 are consequently set to route signals from the modem to CRT driver 56 and stereo speaker system 60.

The operation of Internet CPU/communications control board 64, disc player 34, and television tuner/control board 52 as well as the settings of video and audio switches 54 and 62 for the ENTERTAINMENT, COACH, and INTERNET modes of operation of system 20 are regulated by master control board 67. This operating system unit also performs data decoding, signal/processing, and other herein discussed functions involved in the operation of system 22. Master control board 67 controls the reading of data and accepts data from optically readable disc 22 and control signals from: onboard controls 44 or remote control 26, television tuner/control board 52, and Internet CPU/communications control board 64.

The ENTERTAINMENT, COACH (or Instructional), and INTERNET modes of operation may be selected by the user of system 20 with push button controls 68 (third switch), 70 (first switch), and 72 (second switch) of remote control 26. Remote control 26 also has a numerical keypad 74 with push buttons (1) through (0) and two groups of push buttons respectively identified by reference characters 76 and 78.

Push button group 76 includes BACK, RESTART, PREV (previous), and NEXT buttons 80, 82, 84, and 86, which are empoyed by the system user in the COACH mode of operation. Push buttom group 76, and user-actuatable buttons of on board controls 44 for the player 34 or other user-actuatable buttons of remote control 26, such as push button 70 may be referenced as a first user-actuatable means for controlling the operations of the player 34 when the module is in the COACH mode. Buttons 84 and 86 are multifunctional, being also used in the INTERNET mode of operation, in that case as UP and DOWN arrow buttons. Also employed in the INTERNET operating mode are LEFT and RIGHT arrow buttons 88 and 90, FAVORITES button 92, and UP and DOWN scroll buttons respectively identified by reference characters 96 and 98. Push button group 76, and other user-actuatable buttons of remote control 26, such as push button 72, may be referenced as a second user-actuatable means for establishing a connection to the Internet and thereafter for displaying information available from an Internet site while the module 24 is in the Internet mode.

Push button group 78 includes push button controls utilized in the ENTERTAINMENT operating mode of system 20. These include volume UP and DOWN buttons 100 and 102, a MUTE switch button 103, and CHANNEL selection push buttons 106 and 108, all having conventional features. Push button group 78, and other user-actuatable buttons of onboard controls 38 for television unit 28 and of remote control 26, such as push button 68, are included in the first user-actuatable means as means for selecting and controlling operation of the module when the module is in the ENTERTAINMENT or television viewing mode.

Remote control 26 also has an ON/OFF button switch 104. That switch turns off television unit 28 and stereo speaker system 60, but leaves operating system 48 powered up. This allows the system user to receive E-mail and other information over the Internet even if the video and audio functions are turned off.

The specific construction of remote control 26 and the details of integrated unit 24 are not part of the present invention and accordingly do not appear in the specification or the accompanying drawings. To the extent that such information is of interest to the reader, it may be found in the above-cited U.S. application Ser. No. 08/621,638.

The reader should also note that, in the above discussion, certain features of system 20 have been presented by way of example in the interest of clarity and brevity. For example, in the ENTERTAINMENT mode of operation, the user of system 20 is not limited to television watching. Instead, an audio compact disc, laser disc, DVD disc, or other disc readable by player 34 of integrated unit 24 may be loaded into tray 46, allowing the system user to listen to music, watch a movie, etc.

Figure 4:
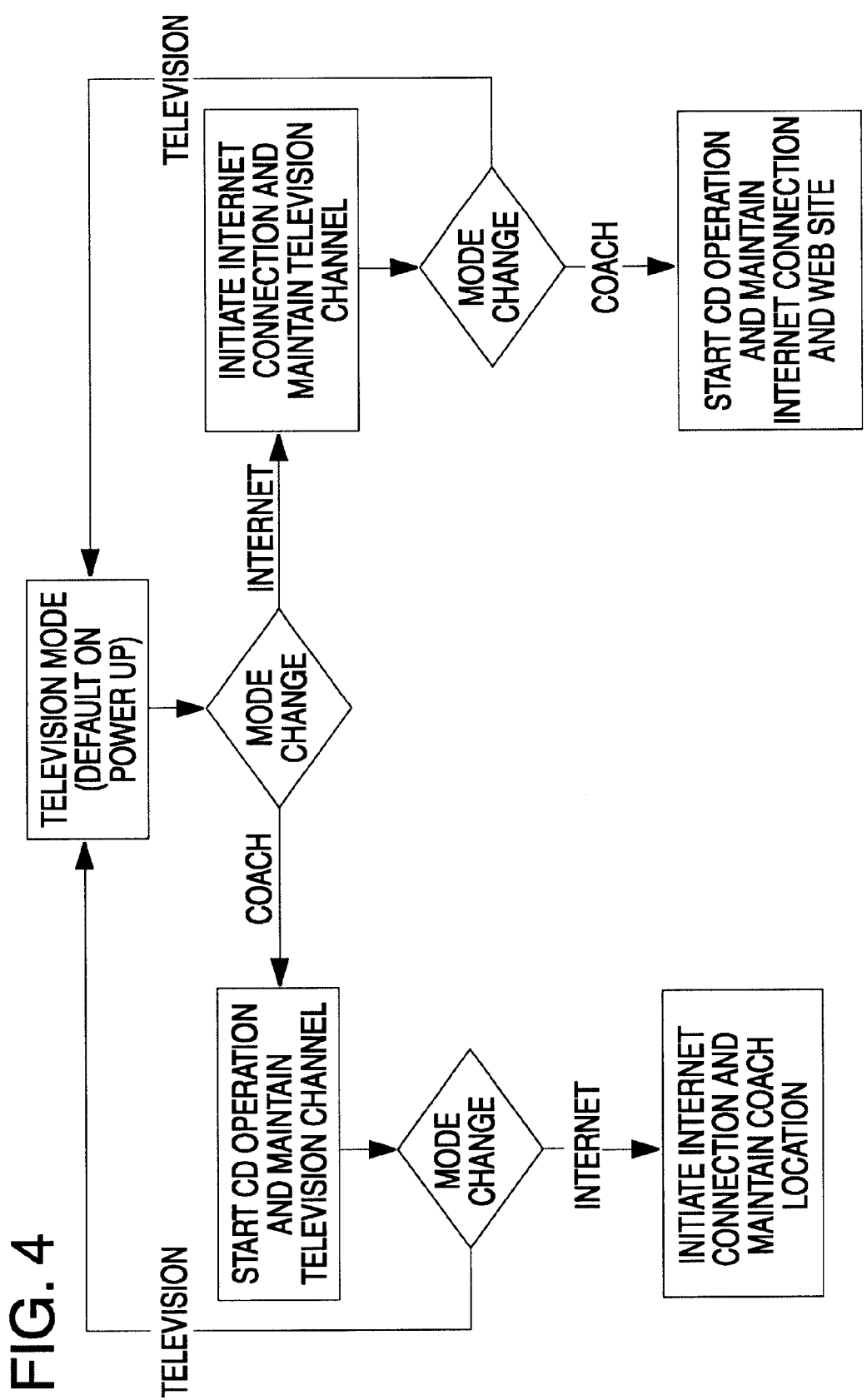
FIG. 4 is a logic flow diagram presenting, in visual form, the operating protocol for the FIG. 1 system.
Figure 5:
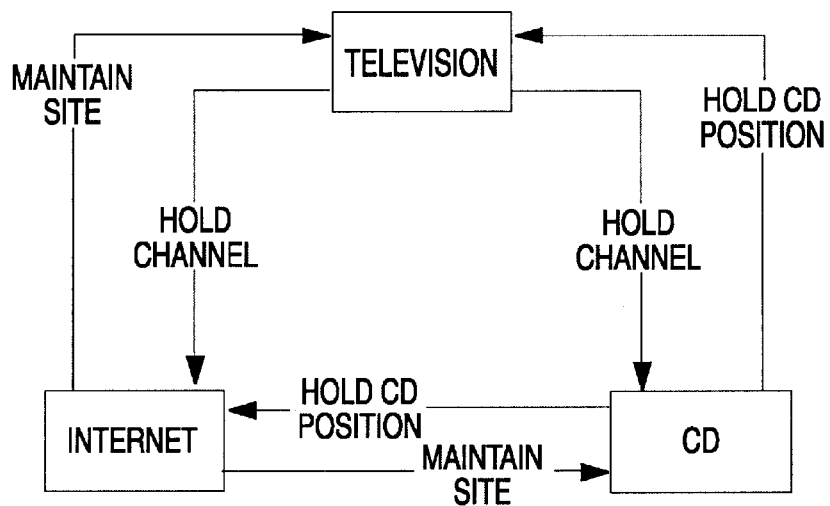
FIG. 5 is a functional diagram, showing how the multifunctional system of FIG. 1 picks up where it leaves off when it is switched from one operating mode to another and then back to the first mode.

An important feature of the present invention (see FIGS. 4 and 5 ) is that, if the operation of system 20 is switched from one mode to another, operation in the switched from mode is frozen such that, when operation is switched back to that mode, operation will be resumed from the point at which is frozen. This is important, particularly in the COACH mode of operation as, in that mode, the system user is likely to be in the process of navigating through a hierarchical set of menus to reach information of interest. With the system frozen the user does not have to navigate back through the hierarchy of menus to reach the screen he or she left. This can be particularly significant if the user is well along in the navigation process.

Switching from the INTERNET mode of operation to any other mode will maintain the Internet site reached by the user at the time of switching with that site being automatically re-accessed when operation of system 20 is switched back to the INTERNET mode. Similarly, if the user is operating system 20 in the ENTERTAINMENT mode to watch television, the channel to which the television set is tuned when switching occurs will be remembered when the system is switched to a different operating mode; and that channel will be brought up when the ENTERTAINMENT mode is re-selected.

The foregoing discussion of system 20 assumes that the operation is controlled with remote 26. The operation can equally be controlled by onboard controls appropriately included in control complement 44.

A representative system 20 employing the principles of the present invention will typically have up to five levels of menus, and the menus at each level may afford the system user up to nine choices. The hierarchical structure thus "fans out" from level-to-next-lower level, giving the user up to 59,049 choices if five levels are used and if all menus on all levels provide the permitted maximum of nine choices as shown by the following table.

TABLE 1

| Menu Hierarchy Level | Number of Menus | Number of Choices (Descending Order) |
| --- | --- | --- |
| Top (112a) | 1 | 9 |
| Second (112b) | 9 | 81 |
| Third (112c) | 81 | 729 |
| Fourth (112d) | 729 | 6561 |
| Bottom | 6561 | 59049 |

The choices at each level may be information—a static text, graphic, or text/graphic presentation or a video—instead of next lower level menu selections or a mixture of menu selections and information choices. However, it may be desirable to avoid a mixed category to minimize confusion and promote ease of use.

It is emphasized that Table 1 is concerned with only a representative hierarchy of menus. There may be fewer—or more—than five levels in the hierarchy, and the hierarchy may be asymmetric. For example, at the third level of the Table 3 hierarchy, one or more of the menus may be a bottom level menu offering only options for selecting information available from that menu. Present at the same level may be one or more other menus offering choices leading to menus on the next lower (fourth) level.

Figure 3:
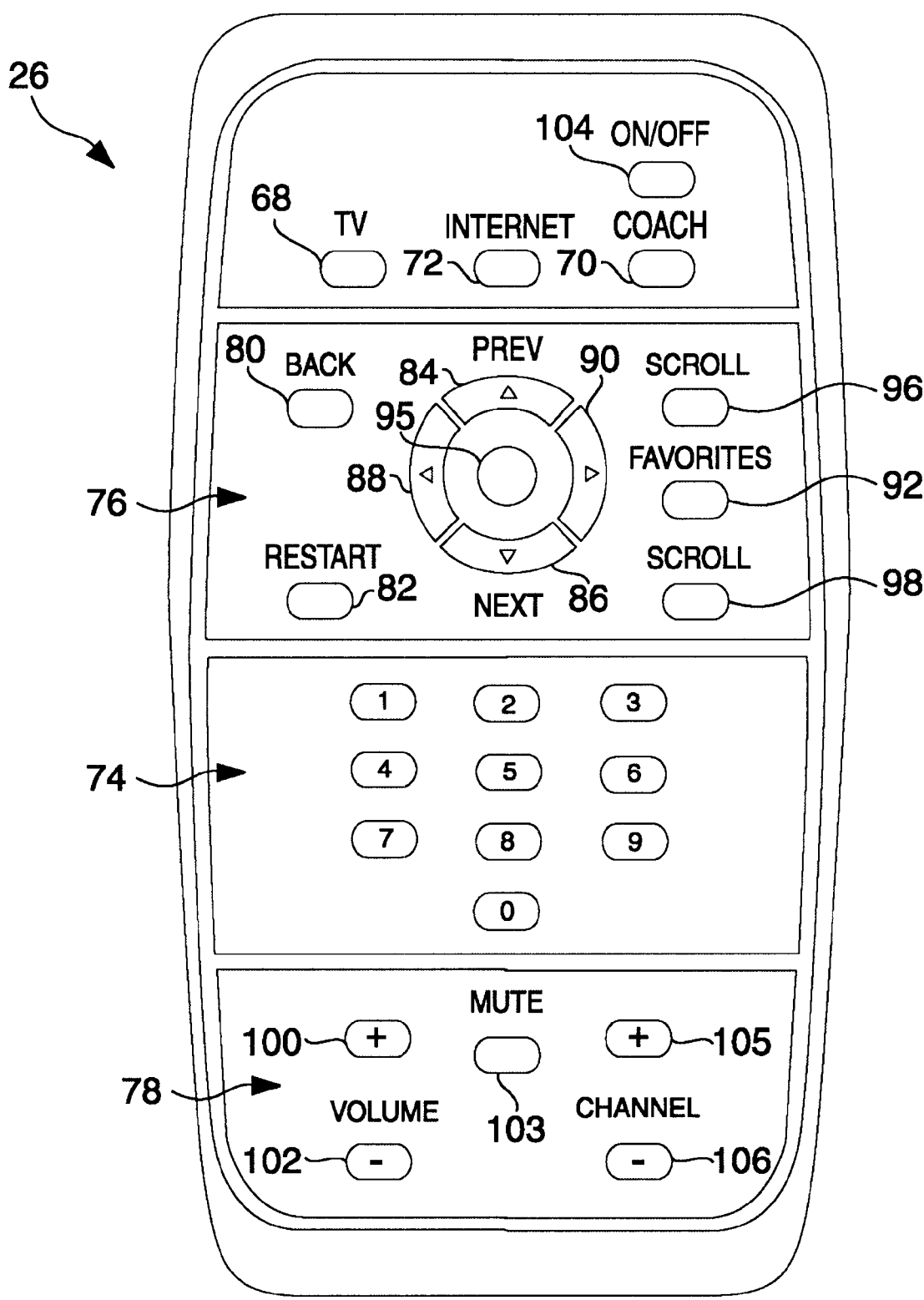
FIG. 3 is a plan view of a remote control which is also a component of the FIG. 1 appliance.

The choices available at each level are preferably limited to nine, as suggested above. These are numbered so that, at every level, a choice can be made by pressing a single, correspondingly numbered one of the buttons ① through ⑨ of remote control numerical keypad 74 (see FIG. 3). This unique feature is another one which makes system 20 easy and convenient to use and therefore acceptable to a person without technical training or inclination and with only the instruction provided by introductory video 108.

Figure 6:
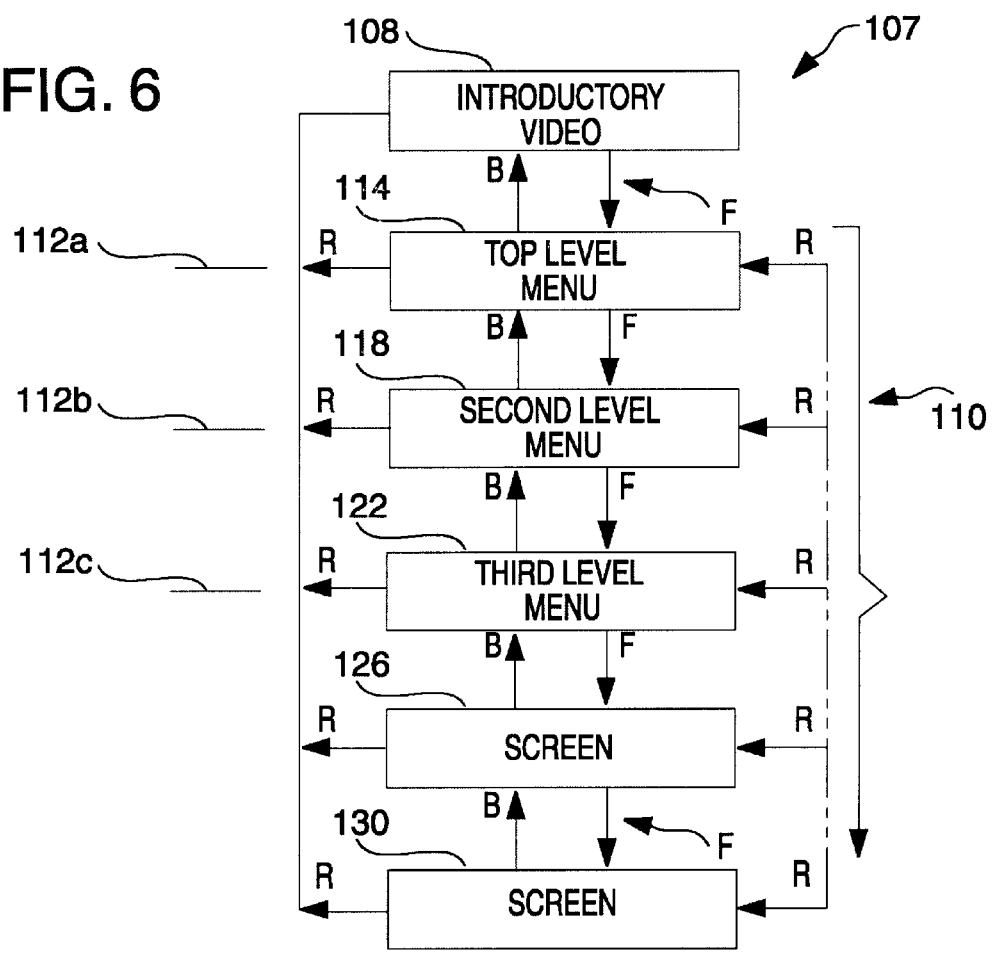
FIG. 6 show, diagrammatically, one representative navigation chart which includes an introductory video and a hierarchy of menus that can be quickly and easily navigated by a user of the FIG. 1 system to reach information of interest stored on a video compact disc or other data storage device.

Referring still to the drawing, the chart 168 in FIG. 6 depicts one representative course that may be navigated with system 20 operating in the COACH mode to retrieve information on a selected subject from optically readable disc 22 and to display that information on screen 32 with any audio components of the information being propagated by speaker system 60. Thus, as described below, push button group 26 and other first user-actuatable means for controlling the player when the module 24 is in the COACH mode along with the items of information and the hierarchy of menus correspond to a means for selectively retrieving information on a subject from the encoded disc 22 or information storage means.

In this representative example, it is assumed that the user of system 20 is seeking information on stocking a pantry with dry and bottled goods.

First, the reader is reminded that integrated unit 24 defaults to the ENTERTAINMENT mode of operation when the on-off switch 104 of remote control 26 is pressed to turn on the television unit 28. To switch to the learn-then-perform or COACH mode, the user presses COACH button 70 as discussed above. This results in an introductory video 108 being retrieved from disc 22 and played. The introductory video describes the operation of system 20 and tells the user how to reach information on an item of interest. This is done by navigating through a hierarchy of menus such as that hierarchical array identified by reference character 110 in FIG. 6.

Figure 7:
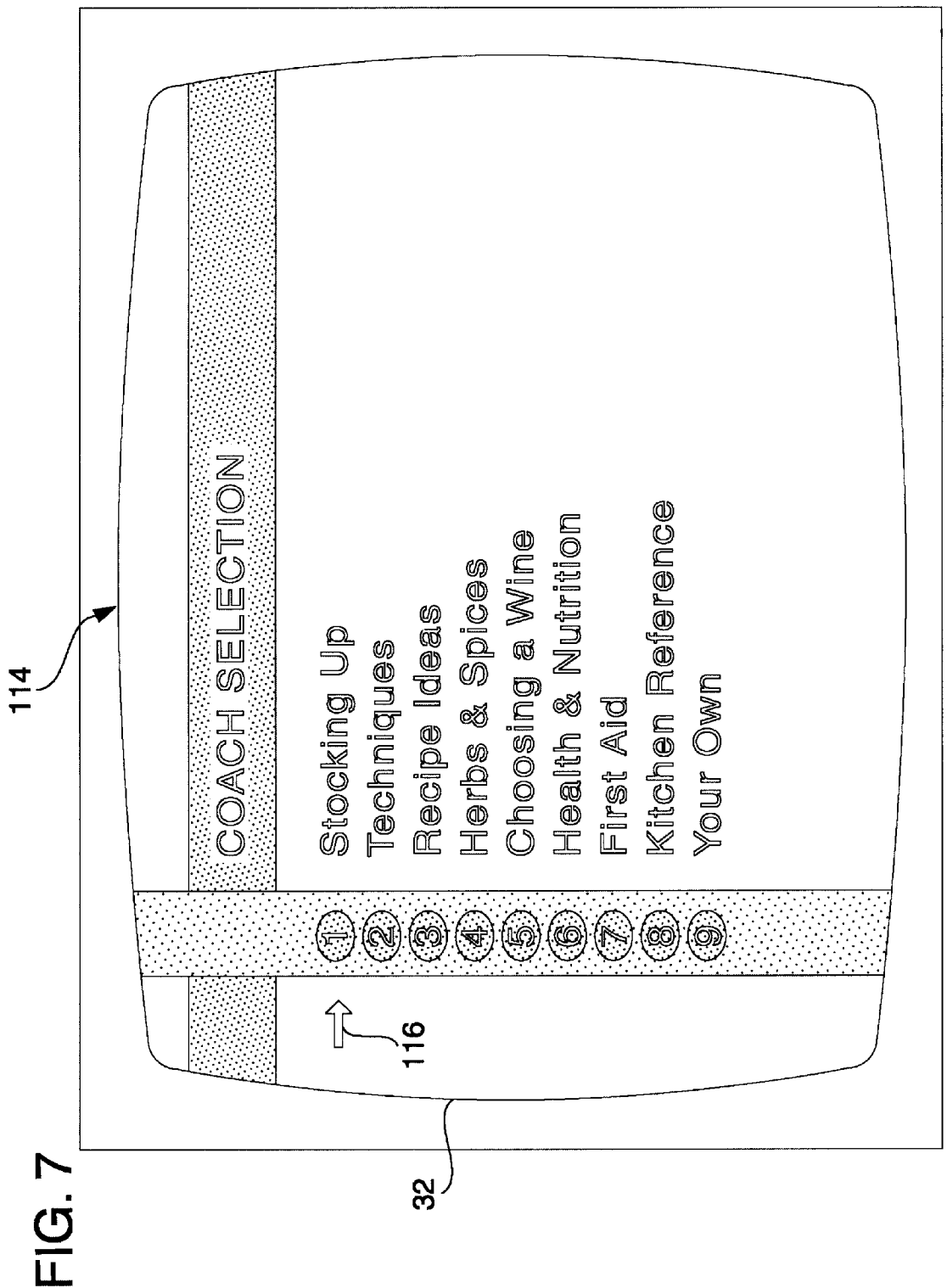
FIGS. 7–9 depict a representative set of menus which would be displayed to a user following a course through the FIG. 6 navigation chart to reach information on dry and bottled goods with which a pantry might be stocked.
Figure 8:
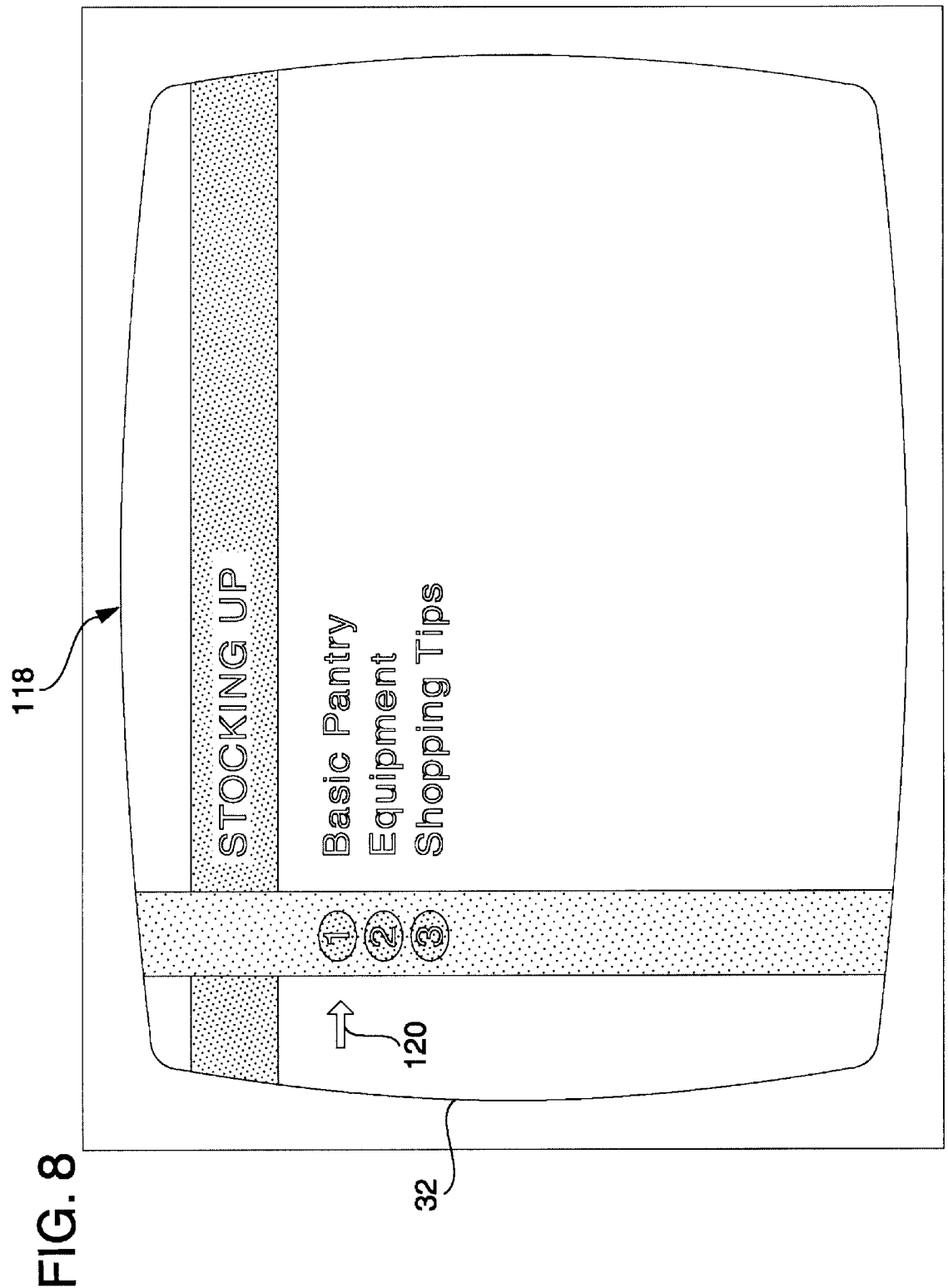
Figure 9:
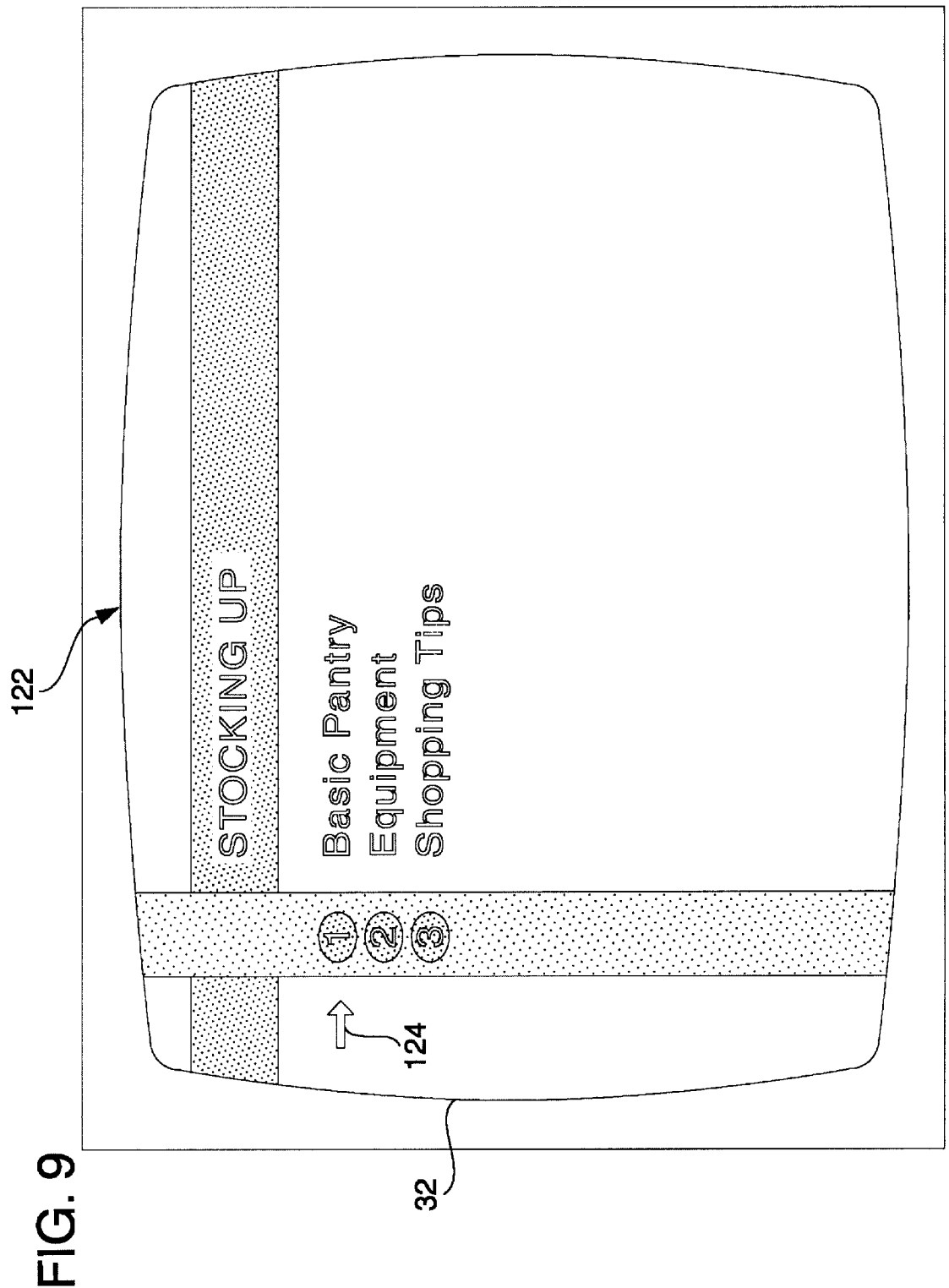

Once the introductory video 108 has been played, the user has two options. One is to press the dedicated RESTART button 82 of remote 26. This causes the introductory video to be replayed. The second option is to press the also dedicated forward (NEXT) button 86. This results in the top (112a) level menu 114 shown in FIG. 7 being displayed. That menu has nine choices. Choice one is appropriate to reach the information of interest in the representative information selection example under discussion as indicated by arrow 116 in FIG. 7. Therefore, the user presses button ① on the remote control numerical keypad 74. This brings up a second (112b) level menu identified by reference character 118 in FIG. 8. This menu offers the user three choices with choice one being appropriate as indicated by arrow 120. Accordingly, the user presses button ① on keypad 74 again at this juncture. This brings up a third (112c) level menu 122 (see FIG. 9). This representative menu also offers the user three choices with choice one again being appropriate as indicated by arrow 124. This user accordingly presses keypad button ① for a third time.

Figure 10:
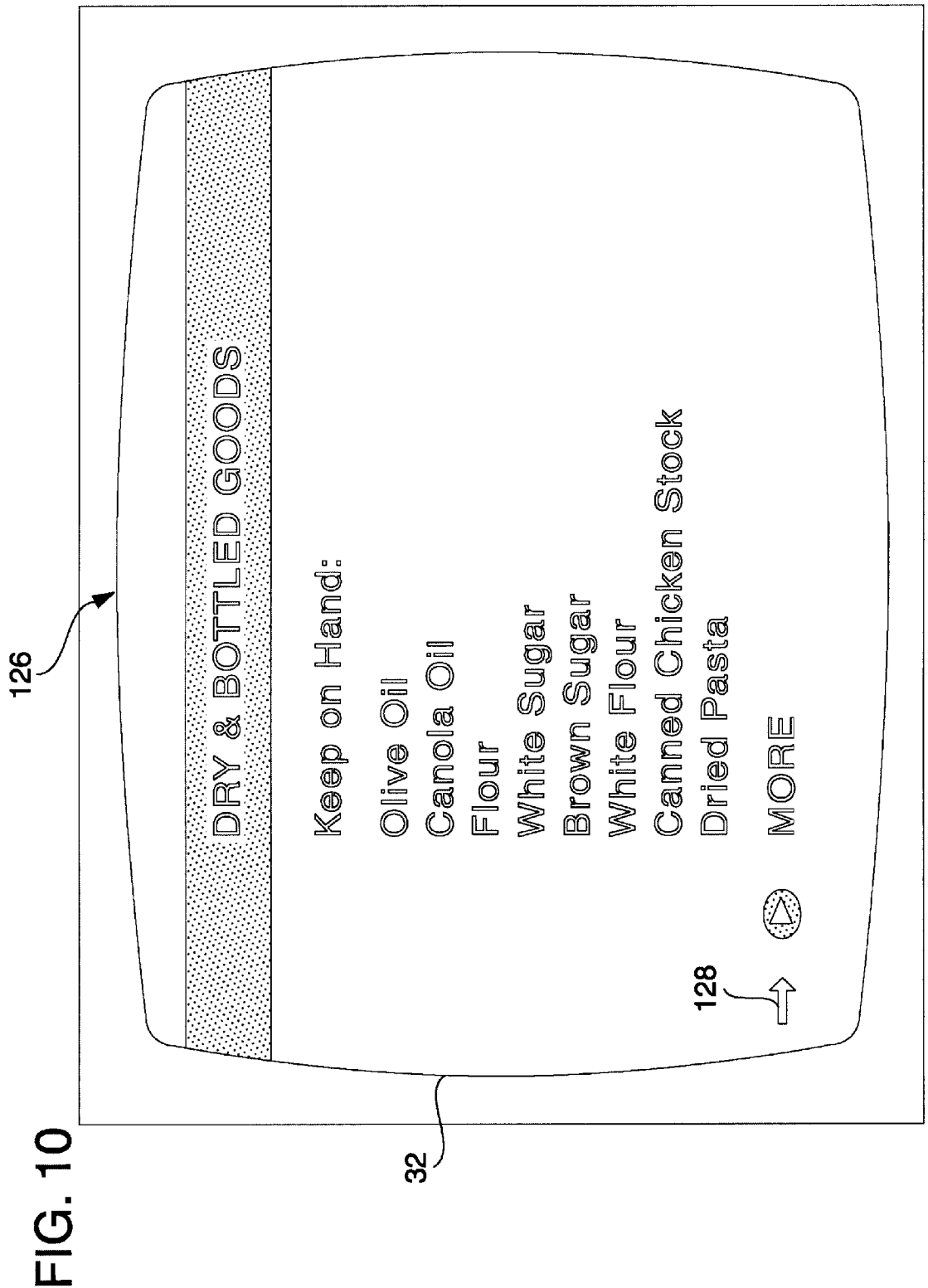
FIGS. 10 and 11 are two screens of information which are available for display to the system user when the user makes a choice from the lowest level menu in the hierarchical array depicted in FIG. 6.

Pressing keypad button ① for the third time retrieves and brings to the screen 32 of integrated unit 24 the information on stocking a pantry sought by the user of system 20 because menu 112c is the bottom level menu reached by the exemplary navigation course under discussion. The screen that appears is shown in FIG. 10 and identified by reference character 126. The information sought by the user is displayed in textual form. It remains on screen 32 until further action is taken by the system user.

In this particular example, the information on the selected subject is too voluminous to fit on a single screen. In this and like cases, the legend MORE appears at the bottom of the screen. When that happens, the user can proceed to the next screen as suggested by arrow 128 by pressing remote control NEXT button 86. In the current example, this brings up on screen 32 a second display shown in FIG. 11 and identified by reference character 130.

Screen 130 ends with the legend END OF TEXT. This indicates that all of the information on the subject selected by the system user has been retrieved from disc 22 and displayed on screen 32.

In the foregoing example, the information retrieved from the optically readable disc 22 is displayed in static form. In other instances, the information is presented in the form of one or more video clips selected from a menu by the system user. Once the selected clip or clips have played: (a) the user is automatically returned to the menu from which the video clip or clips were selected, or (b) the video clip is automatically replayed until stopped by the system user pressing remote control RESTART button 82 to return to introductory video 108 (or top level menu 112a) or BACK button 80 to back up one step to the menu from which the video clip format information was selected. This automatic recycle feature is important because the system user is repeatedly given the appropriate information without any action on the user's part. That can be a decided advantage, as one example, to a system user preoccupied with administering first aid to a poisoning victim in need of immediate attention.

Figure 11:
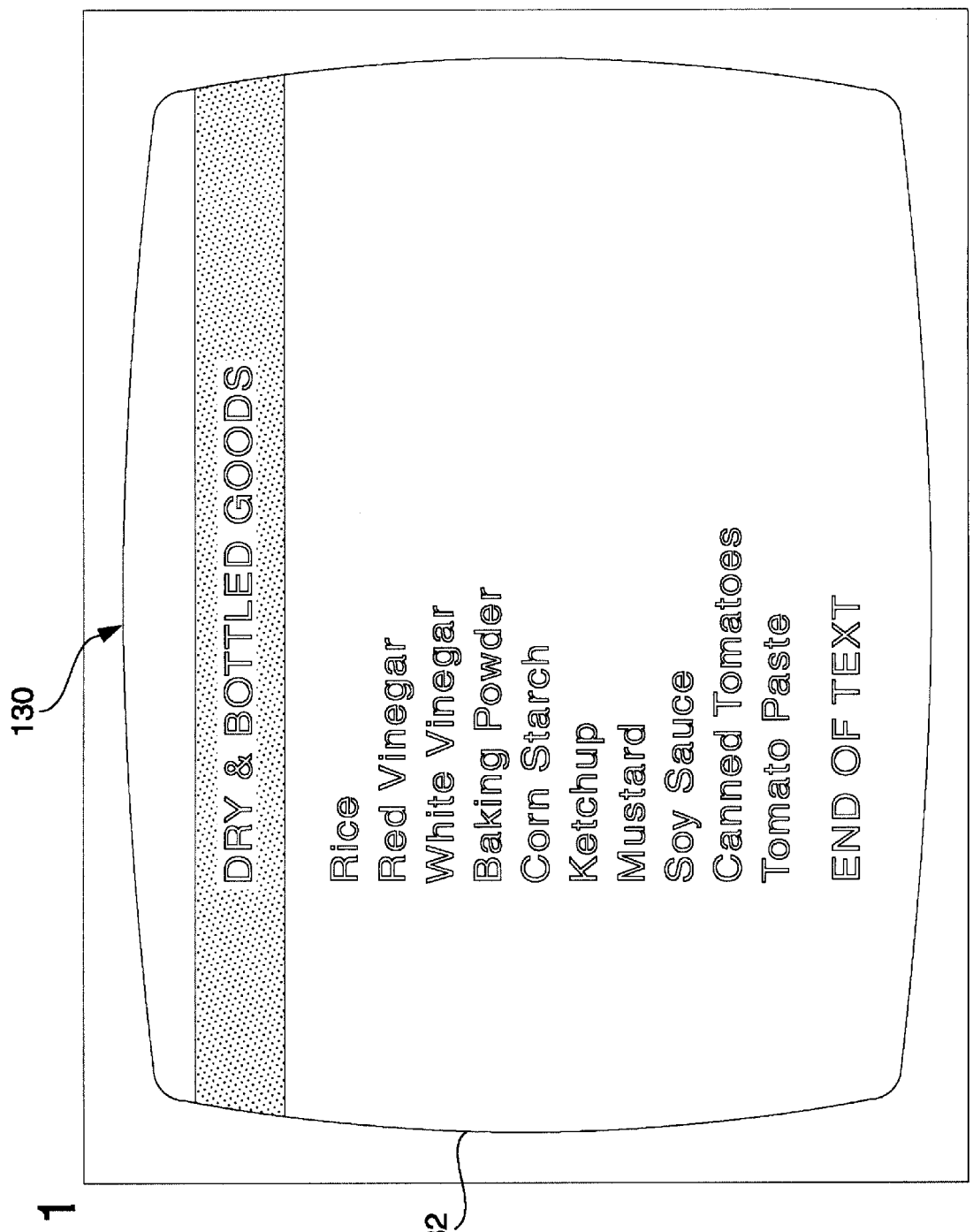

As shown in FIG. 6, the system user can return in one step from any point, be it a menu or a display of information as shown in FIGS. 10 and 11, to the introductory video 108 (or to top level menu 114, depending on which way remote 26 is programmed). This is done by pressing remote control RESTART button 82. RESTART button 82 can also be employed to interrupt a presentation of information on screen 32 and return the system user to the top level 112a—or—the introductory video 108. This ability to jump back to the top level menu or introductory video by pressing only one button is a significant feature of the invention. It allows a system user, especially an inexperienced one, to at any time easily and immediately rerun part or all of the introductory video if he or she perceives the need for a refreshed recollection of what is available or how to proceed in order to reach information on a subject of interest.

Another comparable, and equally important, feature of the invention is that the system user can back up one step in the step-by-step information accessing process by pressing the dedicated remote control button 84 labeled PREV. In the example under discussion, for instance, this enables the system user to back up from screen 130 to screen 126, from the latter to third level menu 112c, from any menu in the hierarchy to a higher level menu, and from the highest level menu 112a to the introductory video 108. This allows the user to easily and by using only one button review the information presented on screen 32 in a preceding step, to navigate a different path through the available choices, and to return to the introductory video from top level menu 112a.

Referring again to FIG. 3, it will be remembered that the INTERNET mode of operation of system 20 may be selected by pressing push button 72 of remote 26. Operation of the system in the INTERNET mode is controlled with: BACK push button 80, LEFT and RIGHT push buttons 88 and 90, FAVORITES push button 92, GO push button 95, UP and DOWN scroll push buttons 96 and 98, PREV and NEXT push buttons 84 and 86 (which function as up and down arrow buttons in the INTERNET mode), VOLUME UP and VOLUME DOWN buttons 100 and 102, and MUTE button 103. UP, DOWN, LEFT, and RIGHT buttons 84, 86, 88, and 90 are employed in the INTERNET mode of operation to move a cursor 132 (see FIG. 1) around the screen 32 of integrated unit 24.

Pressing GO button 95 activates the instruction, command, etc. to which cursor 132 is pointing. Typically, this will be a hypertext link for jumping from one worldwide web site to another.

BACK button 80 has the opposite function. Pressing that button returns the system 20 user to the site, etc. jumped from by pressing GO button 95.

SCROLL UP and SCROLL DOWN buttons 96 and 98 are employed if a page of information selected for display is too large to fit on integrated unit SCREEN 32. The SCROLL UP and SCROLL DOWN buttons 96 and 98 allow the user to move the selected page up and down on SCREEN 32 to view the wanted parts of that page.

Pressing FAVORITES button 92 brings up on integrated unit SCREEN 32 a list of web sites stored in memory on master control board 67. Cursor 132 is moved to the wanted site on this list with appropriate ones of the push buttons 84, 86, 88, and 90; and GO button 95 is then pressed to connect system 20 to the selected web site.

VOLUME UP and VOLUME DOWN buttons 100 and 102 and MUTE button 103 have the same functions in the INTERNET mode of operation of system 20 as they do in the ENTERTAINMENT mode. Buttons 100 and 102 are employed to increase and decrease the level of sound from speaker system 60, and MUTE switch 103 is used to temporarily turn off the speakers—for example, when speaking on a telephone located in the vicinity of system 20.

Like buttons 84 and 86, the RESTART push button 82 of REMOTE 26 is multi-functional. In the INTERNET mode of operation of system 20, actuating push button 82 returns the system to the home page for which a particular system is programmed and which comes up on SCREEN 32 when the INTERNET mode selection button 72 is pressed.

Figure 12A:
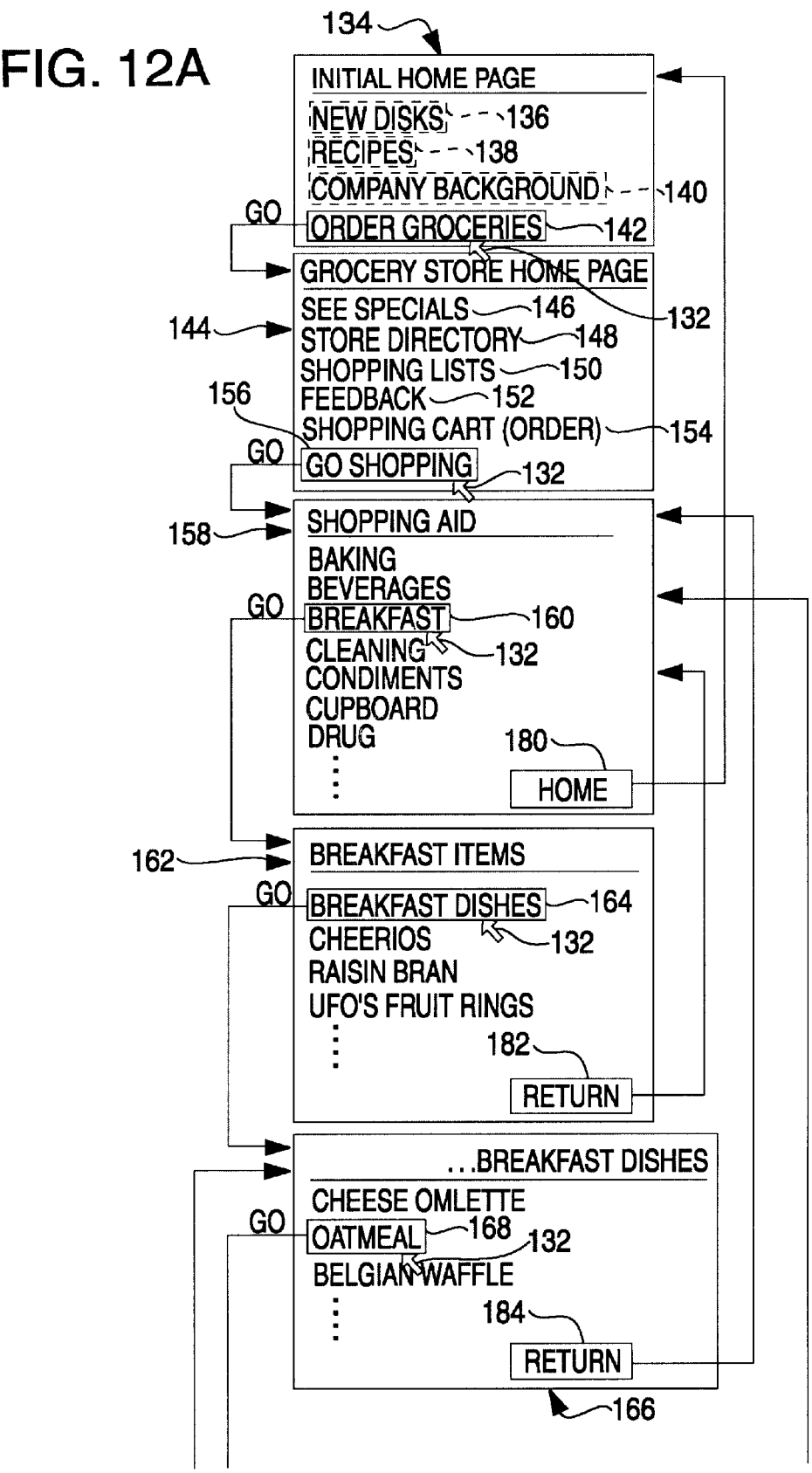
FIG. 12 shows the relationship between FIGS. 12A and 12B which, together, show a representative series of steps which can be executed with onboard or remote control push buttons to order groceries via the Internet.
Figure 12B:
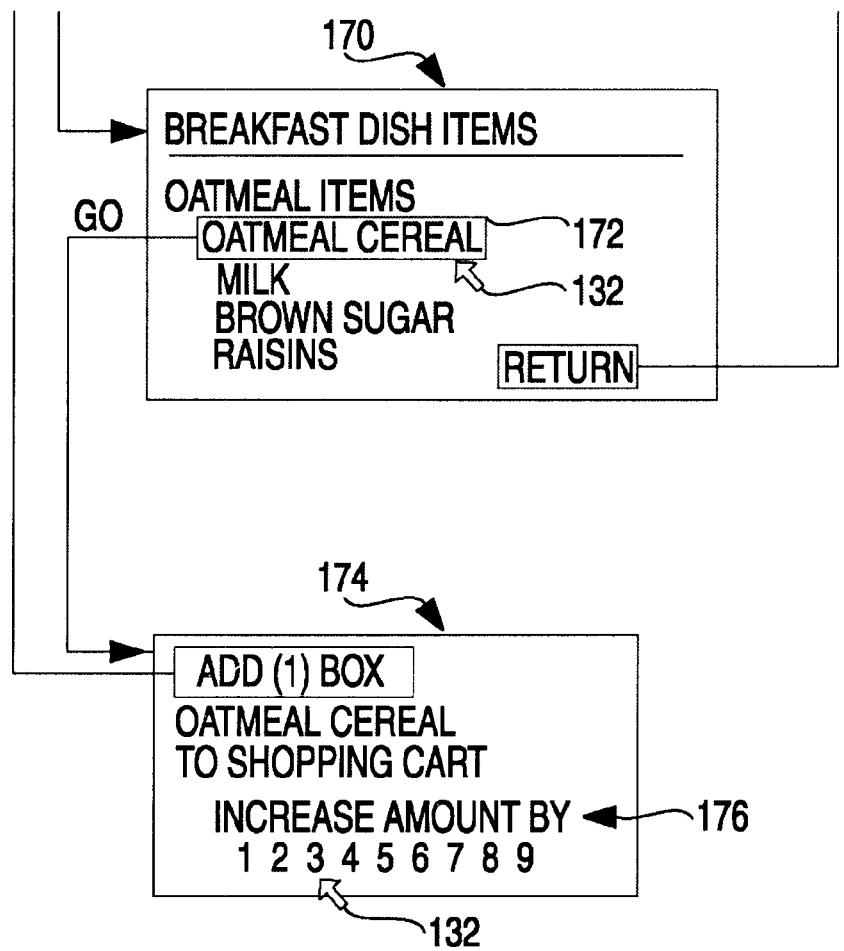

Referring still to the drawing, FIGS. 12A and 12B show how system 20 is employed in one representative and important Internet application of the present invention—to order groceries. To accomplish this task, the user of system 20 turns on integrated unit 24 with ON/OFF switch 104 and then presses push button 72. That changes the operation of the system from the default ENTERTAINMENT mode to the INTERNET mode and connects module 24 to the Internet through phone line 66. Alternatively, the user of system 20 may switch to the INTERNET mode while in the Coach or Instructional mode by pressing push button 72 to cause the module 24 to switch modes as reflected in FIG. 4. Next, the system user presses FAVORITES buttom 92, bringing up on integrated unit screen 32 the display or home page indentified in FIG. 12A by reference character 134. Listed in this display are the sites which have previously been stored—in this case, those identified by reference characters 136, 138, 140, and 142. These, respectively: (1) afford the system user an opportunity to order additional, optically readable discs with information on subjects of interest; (2) bring up on screen 32 a list of recipes available from an Internet web site; (3) connect system 20 to a web site providing information on the manufacturer of system 20, products available from that manufacturer, etc.; and (4) bring up the home page of a store from which groceries may be ordered over the Internet. In the representative application of system 20 under discussion, the system user selects ORDER GROCERIES link 142 with cursor 132 and then presses GO button 95 to jump to the grocery store's home page 144. Thus, push button 72 and FAVORITES button 92 along with other user- actuatable buttons of remote control 26 that are operable when the module 24 is in the Internet mode are included in the means for establishing a connection to an Internet site related to at least a portion of items of information retrieved from the encoded disc 22 or information storage means when in COACH or Instructional mode. For example, a system user pressing push button 72 (or the second switch of second actuatable means) may cause module 24 to switch from COACH mode to INTERNET mode in order to switch from displaying the items of information on the subject of stocking a pantry as described above in reference to FIGS. 10 & 11 while in COACH mode to ordering groceries at a web site page 158 (i.e., Shopping Aids web page shown in FIG. 12A). The web site or web site page 158, in this instant, is related to the subject of stocking a pantry.

Included on home page 144 are a number of hypertext links identified by reference characters 146 . . . 156. In the scenario under discussion—the ordering of groceries over the Internet it is link 156—GO SHOPPING—that is of interest. The system user accordingly moves cursor 132 to this link with appropriate ones of the remote control buttons 84 . . . 90 and then presses GO button 95, connecting integrated unit 24 to a web site page entitled SHOPPING AIDS and identified by reference character 158. Included on this web site page are a number of links to other sites including the link labeled BREAKFAST and identified by reference character 160. Positioning cursor 132 on this link and then pressing GO button 95 connects system 20 to a web site with a page 162 listing breakfast items which can be ordered over the Internet from the store maintaining home page 144 such as Cheerios, Raisin Bran, and UFO's Fruit Rings. Also appearing on web site page 162 is a link entitled BREAKFAST DISHES and identified by reference character 164. Placing cursor 132 on link 164 and then pressing GO button 132 connects system 20 to a web site with a page 166 which includes a list of breakfast dishes including cheese omelet, oatmeal, and Belgian waffles. In the representative application of system 20 under discussion, it is assumed that the system user wishes to have on hand the supplies necessary to prepare oatmeal for breakfast. This being the case, the system user positions cursor 132 on the link 168 labeled OATMEAL with one or more of the remote control buttons 84 . . . 90 and then presses GO button 95. This connects system 20 to a web site with a page 170 listing the items which one may wish to have on hand if oatmeal is to be served for breakfast such as the cereal itself, milk, brown sugar, and raisins.

Assuming that milk, brown sugar, and raisins are on hand but the cereal is not and needs to be ordered, the user of system 20 places cursor 132 on the label 172 titled OATMEAL CEREAL and then presses GO button 95. This brings up on screen 32 a display 174 which shows that one box of oatmeal cereal has been added to the system user's order (or shopping cart).

Figure 13:
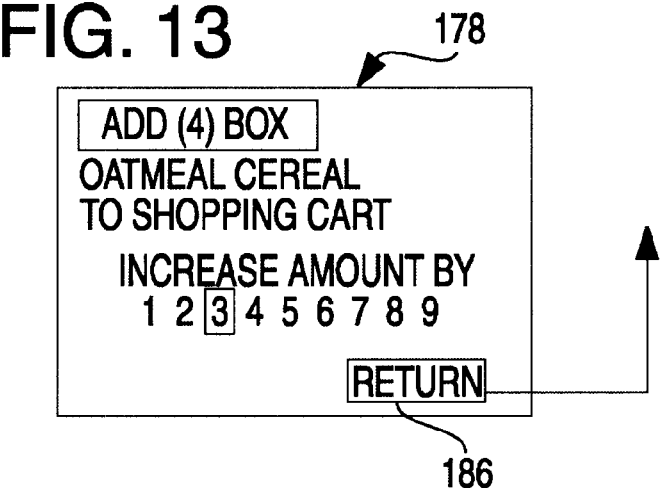
FIG. 13 shows pictorially how the quantity of an item available for order can be increased.

The shopper or system user may add a quantity of a selected item greater than one to his or her order. This is done with exemplary page 174 displayed on screen 32 by pointing cursor 132 at the additional quantity wanted in the INCREASE AMOUNT BY area 176 of page 174. For example, if the shopper wants four boxes of oatmeal cereal, in other words, to increase the number of boxes ordered by three, the shopper points cursor 132 at the numeral 3 in INCREASE AMOUNT BY area 176 and then presses GO button 95. This brings up on screen 32 a page 178 (see FIG. 13) showing that four boxes of oatmeal cereal have been ordered from the grocery store.

Referring back to FIG. 12A, activatable commands identified by reference characters 180, 182, and 184 and respectively labeled HOME and RETURN appear when pages 158, 162, and 166 are brought up on integrated unit screen 32. Pointing cursor 132 at either of the RETURN commands 182 or 184 and then pressing GO button 95 returns system 20 to the grocery store web site page labeled SHOPPING AIDS. This enables the system user or shopper to order from the grocery store products in those additional categories identified specifically and by ellipses on page 158.

Once the grocery store order has been completed, the shopper can jump back to the initial home page by pointing cursor 132 at the HOME command 180 on page 158 and then pressing GO button 95 to select another favorite, link, instruction, or command available from home page 134. As examples, the system user may select another favorite from the list displayed on that page, bringing up a list of items such as those discussed above from which a selection can be made.

As will be apparent to the reader from the foregoing, operation of system 20 in the INTERNET mode will typically involve the use of hypertext links to jump from page to page to reach an item of interest. For example, in increasing the ordered number of boxes of oatmeal by three as discussed above, the shopper is employing a web site six links away from the initial home page 134. It is an important feature of the present invention, as discussed above, that the address of this web site is held in memory on master control board 67 if the system user switches to the COACH or ENTERTAINMENT mode of operation from page 170. When the system user thereafter switches back to the INTERNET mode of operation, module 24 is automatically reconnected to the Internet if the previous connection has timed out, and the user is returned directly to page 170 rather than having to have to renegotiate the series of links discussed above to reach that home page. This is of immense importance from the point-of-view of convenience and user friendliness.

The invention may be embodied in many forms without departing from the spirit or essential characteristics of the invention. The present embodiment is therefore to be considered in all respects as illustrative and not restrictive. The scope of the invention is indicated by the appended claims rather than by the foregoing description, and all changes which come within the meaning and range of equivalency of the claims are therefore intended to be embraced therein.

What is claimed is:

1. A multi-functional system comprising:
    a module having a plurality of independent modes of operation including an operation system, a player for a disc with laser readable data stored thereon, and a screen for displaying information retrieved from said disc, one of the independent modes is an Internet mode;
    a disc as aforesaid operatively associated with said player;
    a first user-actuatable means operably associated with said module for controlling the operation of said player while in a first of the plurality of independent modes, said first user-actuatable means having a first switch operably associated with said module to cause the same to be in said first mode; and
    a second user-actuatable means operably associated with said module for establishing a connection to the Internet, and thereafter for displaying information available from an Internet site on said screen while said module is in said Internet mode, the second user-actuatable means having a second switch operably associated with said module to cause the same to be in said Internet mode;
    and wherein, said operating system is constructed such that, when operation of said module is switched from said first mode of operation to said Internet mode of operation via said second switch, said first mode of operation is frozen at a point, operation being resumed at said point where is was frozen when said module is switched back to said first mode of operation via said first switch.

2. A system as defined in claim 1 in which said second user-actuatable means automatically brings a home page display up on said screen when the connection to the Internet is established.

3. A system as defined in claim 1 in which said second user-actuatable means includes user-actuatable selector means for accessing the world wide web on the Internet.

4. A system as defined in claim 1 in which:
    said screen is a component of a television set incorporated in said module; and
    said first user-actuatable means further comprises means for selecting operation of said module in a television viewing mode.

5. A system as defined in claim 1 in which said first user-actuatable means is incorporated in a remote control.

6. A system as defined in claim 5 in which said remote control comprises a separate user-actuatable means for selecting operation of said system in each of its operating modes.

7. A system as defined in claim 5 in which said first user-actuatable means is operable, when said module is operating in said Internet mode, to move a cursor around said screen.

8. A system as defined in claim 7 wherein said first user-actuatable means is further operable to select an item displayed on said screen and identified with said cursor.

9. A system as defined in claim 7 wherein said first user-actuatable means comprises controls for scrolling up and down a display appearing on said screen.

10. An information retrieval and display system which comprises:
    an operating system;
    an image display screen;
    information storage means for storing items of information and a hierarchy of menus to selectively access said items of information;
    means for selectively retrieving information on a subject from said information storage means by selectively accessing a portion of the items of information pertaining to the subject via said hierarchy of menus;
    means for capturing a television signal, converting said signal to a visual image, and displaying said signal on said image display screen;
    means for establishing a connection to an Internet site related to said retrieved portion of said items of information; and
    user-actuatable control means for causing said operating system to switch to one of a plurality of independent modes of operation, including: (a) a first mode in which information on a subject is selectively retrieved from said information storage means and displayed on said image display screen; (b) a second, television viewing mode; and (c) a third mode in which said operating system is connected to the Internet;

and wherein, said operating system is configured such that, when operation of said operating system is switched from one mode of said plurality of independent modes of operation to an alternate mode of said plurality of independent modes of operation via said user-actuatable control means, a reentry point corresponding to said one mode is saved by the operating system so that operation of said one mode is resumed at said reentry point when said operating system is switched back to said one mode via said user-actuatable control means.

11. A system as defined in claim 10 wherein said one mode is said third mode and said alternate mode is said first mode, and wherein said one mode is resumed at an Internet site to which the system was connected when operation of the system was switched from said one mode to said alternate mode.

12. A system as defined in claim 10 wherein said one mode is said first mode and said alternate mode is said third mode, and wherein said one mode is resumed at said point at which the retrieval of information was interrupted by switching the operation of said system from said one mode to said alternate mode.

13. A system as defined in claim 10 wherein said user-actuatable control means is incorporated in a remote control.

14. A system as defined in claim 10 wherein said information storage means comprises an optically readable disc and said means for retrieving information from said information storage means comprises a player for an optically readable disc controlled via said user-actuatable control means.

15. A system as defined in claim 14 in which data stored on said disc includes an introductory video and said user-actuatable control means further comprises controls for advancing the operation of said player from playing the introductory video to retrieving and displaying of a top level menu in said hierarchy.

16. A system as defined in claim 14 in which data stored on said disc includes an introductory video and said user-actuatable control means further comprises controls for returning: (a) from a top level menu in said hierarchy to said introductory video; (b) from one menu of said hierarchy displayed on said screen to another menu at the next higher level in said hierarchy from which the displayed menu was selected; and (c) from a user selected item of information displayed on said screen to a menu of said hierarchy from which the user selected item of information was selected.

17. A system as defined in claim 14 in which data stored on said disc includes an introductory video and said user-actuatable control means further comprises controls for returning in a single step from said display of information on said screen of said module to the top level menu in said hierarchy, from said display of information on said screen of said module to the introductory video, and from a lower level menu of said hierarchy to said introductory video.

18. A display system comprising:
a module having a plurality of independent modes of operation including an instructional mode and an Internet mode, a player for a disc with laser readable data stored thereon, and a screen for displaying information retrieved from said disc, said laser readable data on the disc including an introductory video, items of information, and a hierarchy of menus to selectively access said items of information;

a first user-actuatable means operably associated with said module for controlling the operation of said player while said module is in the instructional mode such that a user is able to obtain information on a subject by selectively accessing said introductory video and a portion of said items of information pertaining to said subject via said hierarchy of menus, said first user-actuatable means having a first switch operably associated with said module to cause said module to be in said instructional mode; and a second user-actuatable means operably associated with said module for establishing a connection to said Internet, displaying a list of Internet sites related to said subject, selecting one of said Internet sites and thereafter displaying information available from said selected one Internet site on said screen while said module is in said Internet mode, said second user-actuatable means having a second switch operably associated with said module to cause said module to be in said Internet mode and to establish said connection to said Internet;

and wherein, said module is operably configured such that when operation of said module is switched from said instructional mode of operation to said Internet mode of operation via said second switch, said instructional mode of operation is frozen at a point, operation being resumed at said point where is was frozen when said module is switched back to said instructional mode of operation via said first switch.

19. The display system of claim 18 in which said second user-actuatable means includes a third switch operably associated with said module towards causing the same to display said list of Internet sites related to said subject.

20. The display system of claim 18 in which:
said plurality of independent modes further includes an entertainment mode;
a television set incorporated in said module, said screen being a component of said television set; and
said first user-actuatable means further comprises means for causing said module to switch to said entertainment mode and for controlling the television set while said module is in said entertainment mode.

* * * * *